United States Patent [19]

Horacek

[11] Patent Number: 6,031,040
[45] Date of Patent: Feb. 29, 2000

[54] INTUMESCENT SEALING AND COVER PROFILES

[75] Inventor: Heinrich Horacek, Linz, Austria

[73] Assignee: DSM Fine Chemicals Austria GmbH, Austria

[21] Appl. No.: 09/082,728

[22] Filed: May 21, 1998

[30] Foreign Application Priority Data

May 21, 1997 [AT] Austria ........................................ 857/97

[51] Int. Cl.$^7$ .............................. C09K 21/14; C08J 3/00; C08K 3/04; C08L 51/00; C08L 67/00
[52] U.S. Cl. ........................ 524/495; 428/323; 428/325; 524/115; 524/127; 524/141; 523/179
[58] Field of Search .................................. 524/115, 127, 524/141, 495, 496; 428/323, 325; 523/179

[56] References Cited

U.S. PATENT DOCUMENTS

| | | | |
|---|---|---|---|
| 4,886,858 | 12/1989 | Katagiri et al. | 525/301 |
| 5,578,671 | 11/1996 | Welna | 524/443 |
| 5,736,109 | 4/1998 | Howorth et al. | 422/179 |

*Primary Examiner*—Patrick D. Niland
*Attorney, Agent, or Firm*—Wenderoth, Lind & Ponack, L.L.P.

[57] ABSTRACT

Intumescent sealing and cover profiles obtainable by extrusion of a mixture comprising thermoplastic elastomers, expandable graphite, flame retardants, inorganic fillers and inorganic fibers at from 180 to 250° C. and subsequent shaping to form the appropriate profiles, and their use.

7 Claims, No Drawings

INTUMESCENT SEALING AND COVER PROFILES

The invention relates to intumescent sealing and cover profiles produced by extrusion which can be used as seals for both cold and hot gas. Seals have already been produced from many materials. Thus, for instance, it is prior art to produce seals from linear thermoplastic polyolefins, as known for instance, from EP-A1-0714426 or EP-A1-0714427. Further cold gas seals are produced, for example, from PVC, EVA or from thermoplastic elastomers by extrusion. Here, high-performance elastomer profiles in particular have hitherto been manufactured in a plurality of process steps in which, after the shaping process in the extruder, the still plastic profiles are crosslinked in vulcanization units under the action of pressure and heat. Intumescent seals or hot gas seals which comprise expandable graphite and are based, for example, on polyolefins or acrylonitrile-butadiene copolymers are known. These intumescent seals are produced by various methods, for instance spreading and drying processes, by means of paper technology or by rubber processing technology.

It is an object of the present invention to find seals based on thermoplastic elastomers which can be used both as cold gas seals and also as hot gas seals and are produced by extrusion in one process step.

Unexpectedly, this object has been able to be achieved by means of extrudates made from a mixture comprising thermoplastic elastomers, expandable graphite, flame retardants, inorganic fillers and inorganic fibers.

The present invention accordingly provides intumescent sealing and cover profiles obtainable by extrusion of a mixture comprising thermoplastic elastomers, expandable graphite, flame retardants, inorganic fillers and inorganic fibers at from 180 to 250° C. and subsequent shaping to form the appropriate profiles.

The mixture used for producing the profiles of the invention comprises from 20 to 80% by weight, preferably from 40 to 60% by weight, of thermoplastic elastomers, from 15 to 35% by weight, preferably from 20 to 30% by weight, of expandable graphite, from 1 to 10% by weight, preferably from 2 to 6% by weight, of flame retardants, from 10 to 50% by weight, preferably from 12 to 30% by weight, of inorganic fillers and from 2 to 20% by weight, preferably from 5 to 15% by weight, of inorganic fibers.

Suitable thermoplastic elastomers are those having processing temperatures up to 250° C. Examples are thermoplastic elastomers which are crosslinked by salt formation or by domain formation. From the group consisting of thermoplastic elastomers which crosslink by salt formation, it is possible to use, for example, ethylene-methacrylic acid copolymers (e.g. Surlyn, from DuPont), butadiene-acrylic acid copolymers, sulfonated polybutadienes or sulfonated EPDM rubbers (e.g. Hycar, from DuPont). Suitable thermoplastic elastomers which crosslink by domain formation are, for example, styrene-butadiene-styrene block copolymers (e.g. Kraton D, from Shell Chemical), styrene-butadiene copolymers (e.g. Solpren 400, from Phillips Petroleum), polyester-polyether copolymers (e.g. Hytrel, from DuPont), (Gaflex, from BASF), polypropylene-crosslinked EPDM rubber block copolymers (e.g. Santopren, from Monsanto) or polyether-polyamide block copolymers, (e.g. Pebax, from ATOChem).

As further main constituent, the profiles contain from 15 to 35% by weight of expandable graphite. Depending on the desired application of the profiles and the property profile required as a result, the other constituents are added in the appropriate amounts to the thermoplastic elastomer and the expandable graphite. These constituents are flame retardants, preferably halogen-free flame retardants such as phosphoric esters, triphenyl phosphate, resorcinol diphenyl phosphate, etc., and inorganic fillers such as aluminum trihydroxide, gypsum, clay, silicates, talc, chalk, titanium dioxide, magnesium carbonate, magnesium hydroxide, mica, vermiculite, quartz flour and zinc oxide.

Preference is given to adding halogen-free flame retardants in an amount of from 2 to 6% by weight. Particular preference is given to using phosphoric esters as flame retardants. The inorganic fillers are preferably added in an amount of from 5 to 15% by weight, with aluminum trihydroxide being particularly preferred. Preference is given to using inorganic fillers in which at least 50% by weight has a particle size of from 1 to 2 $\mu$m.

A further constituent of the mixture used for producing the profiles is inorganic fibers which are preferably added in an amount of from 5 to 15% by weight. These fibers can comprise glass, calcium phosphate or basalt, with preference being given to glass fibers. The fibers should preferably have a length of from 2 to 6 mm.

Further additives such as pigments, e.g. iron oxides or chromium oxides, can be added to the mixture in an amount of from 0.5 to 3% by weight. To produce the profiles of the invention, a mixture is first prepared from the abovementioned constituents in the desired amounts and this mixture is then extruded by means of suitable extruders, for example by means of a twin-screw extruder or a Buss kneader.

The individual constituents can also be introduced directly (without prior mixing) into the extruders. Depending on the starting elastomers, the extrusion temperature is 180–250° C., preferably from 180 to 210° C. The mixture is first processed to form extrudates which are chopped cold after extrusion. The cylindrical granules obtained in this way are subsequently molded on an injection molding machine to produce the appropriate sealing profiles and cover profiles. In a further production variant, the extrudates are directly extruded continuously through a die of appropriate geometry to give continuous profiles.

The profiles of the invention can be used either as hot gas seals or as cold gas seals, for example for fire doors, fire windows, fire-resistant glazing and also for sealing of joints.

When used as cold gas seals, they display rubber-elastic behavior; when used as hot gas seals, they display a desired intumescent behavior together with good mechanical properties, since they do not melt away in the case of fire and form a stable, impermeable crust.

EXAMPLE 1

A mixture of 50% by weight of EVA Levapren 500 HV, 25% by weight of expandable graphite, 5% by weight of Amgard V 490, 5% by weight of glass fibers and 15% by weight of aluminum trihydroxide was processed at from 180 to 210° C. on a twin-screw extruder to give extrudates and chopped cold. Subsequently, the cylindrical granules obtained in this way were molded on an injection molding machine to produce sealing profiles. Their intumescent behavior was characterized by means of thermomechanical analysis and the maximum volume increase was recorded in %. The profiles of Examples 2–9 in Table 1 were produced in a similar manner.

TABLE 1

| No. | Thermoplastic | Glass fibers | Filler | Expandable graphite | Flame retardant | P | Max. VI % |
|---|---|---|---|---|---|---|---|
| 1 | 50% Levapren 500 HU EVA (Bayer) | 5% | 15% ATH | 25% | 4% Amgard V490 | 1% | 350 |
| 2 | 50% Surlyn 7930 E-MMa copolymer (DuPont) | 5% | 15% ATH | 25% | 4% Amgard V490 | 1% | 400 |
| 3 | 50% Hycar (DuPont) Sulfonated polybutadiene | 5% | 15% ATH | 25% | 4% Amgard V490 | 1% | 500 |
| 4 | 50% Kraton D S-B-S (Shell) | 5% | 15% ATH | 25% | 4% Amgard V490 | 1% | 450 |
| 5 | 50% Solpren 400 S-B (Phillips) | 5% | 15% ATH | 25% | 4% Amgard V490 | 1% | 400 |
| 6 | 50% Hytrel (Dupont) Thermoplastic polyester | 5% | 15% ATH | 25% | 4% Amgard V490 | 1% | 475 |
| 7 | 50% Santopren (Monsanto) PP-E-P copolymer blend | 5% | 15% ATH | 25% | 4% Amgard V490 | 1% | 500 |
| 8 | 50% Pebax (ATOChem) Block polyether-polyamide | 5% | 15% ATH | 25% | 4% Amgard V490 | 1% | 400 |
| 9 | 50% Hycar (DuPont) | 5% | 15% ATH | 25% | 4% Amgard V490 | 1% | 450 |

P . . . pigment; max VI . . . max. volume increase

What is claimed is:

1. An intumescent sealing or cover profile obtained by extrusion of a mixture comprising thermoplastic elastomers selected from the group consisting of polyether-polyamide block copolymers, polyester-polyether copolymers and polypropylene-crosslinked EPDM rubber block polymers, expandable graphite, flame retardants, inorganic fillers and inorganic fibers at from 180 to 250° C. and subsequent shaping to form the appropriate profiles.

2. The intumescent sealing or cover profile as claimed in claim 1, wherein the mixture comprises from 20 to 80% by weight of said thermoplastic elastomers, from 15 to 35% by weight of said expandable graphite, from 1 to 10% by weight of said flame retardants, from 10 to 50% by weight of said inorganic fillers and from 2 to 20% by weight of said inorganic fibers.

3. The intumescent sealing or cover profile as claimed in claim 1, wherein the flame retardants used are phosphoric esters, triphenyl phosphate or resorcinol diphenyl phosphate.

4. The intumescent sealing or cover profile as claimed in claim 1, wherein the inorganic fillers used are aluminum trihydroxide, gypsum, clay, silicates, talc, chalk, titanium dioxide, magnesium carbonate, magnesium hydroxide, mica, vermiculite, quartz flour or zinc oxide.

5. The intumescent sealing or cover profile as claimed in claim 1, wherein the inorganic fibers used are fibers comprising glass, calcium phosphate or basalt.

6. The intumescent sealing or cover profile as claimed in claim 1, which further comprises pigments.

7. A method of forming a cold gas seal or a hot gas seal in a structure, which comprises including the intumescent sealing or cover profile of claim 1 in such seal.

* * * * *